United States Patent
Qian et al.

(10) Patent No.: US 7,715,403 B2
(45) Date of Patent: May 11, 2010

(54) METHODS, SYSTEMS, AND COMPUTER PROGRAM PRODUCTS FOR LOAD BALANCED AND SYMMETRIC PATH COMPUTATIONS FOR VOIP TRAFFIC ENGINEERING

(75) Inventors: Edward Y. Qian, Plano, TX (US); San-Qi Li, Plano, TX (US); David Z. Lu, Dallas, TX (US); Rupert Zhu, Richardson, TX (US); Yen Shei, Plano, TX (US)

(73) Assignee: GENBAND Inc., Plano, TX (US)

( * ) Notice: Subject to any disclaimer, the term of this patent is extended or adjusted under 35 U.S.C. 154(b) by 446 days.

(21) Appl. No.: 11/594,568

(22) Filed: Nov. 8, 2006

(65) Prior Publication Data

US 2007/0064613 A1 Mar. 22, 2007

Related U.S. Application Data

(63) Continuation-in-part of application No. 10/943,513, filed on Sep. 17, 2004, which is a continuation-in-part of application No. 10/676,233, filed on Oct. 1, 2003, now Pat. No. 7,424,025.

(60) Provisional application No. 60/526,126, filed on Dec. 1, 2003, provisional application No. 60/551,814, filed on Mar. 10, 2004, provisional application No. 60/748,800, filed on Dec. 9, 2005.

(51) Int. Cl.
*H04L 12/28* (2006.01)
(52) U.S. Cl. .......................... 370/394; 370/389; 370/400
(58) Field of Classification Search ........................ None
See application file for complete search history.

(56) References Cited

U.S. PATENT DOCUMENTS 6,061,348 A 5/2000 Castrigno et al.

(Continued)

OTHER PUBLICATIONS

International Search Report and Written Opinion for International Application No. PCT/US04/31920 (Mar. 4, 2005).

(Continued)

*Primary Examiner*—Robert W Wilson
(74) *Attorney, Agent, or Firm*—Jenkins, Wilson, Taylor & Hunt, P.A.

(57) ABSTRACT

The subject matter described herein includes methods, systems, and computer program products for load balanced and symmetric SPF path computations for VoIP traffic engineering. One method includes advertising an output interface cost in a first direction over a first network segment between a source IP device and a destination IP device that is different from an output interface cost in advertised in a second direction over the first network segment. A plurality of available network paths between the source IP device and the destination IP device is identified. A path cost is calculated for each of the available network paths from the source IP device to the destination IP device. Calculating a path cost includes, for paths that include the first network segment, substituting the output interface cost advertised in the first direction with the output interface cost advertised in the second direction. The path costs are ranked based on the calculated costs. A lowest cost path is selected from the ranked paths. Both directions of a media session are assigned to the lowest cost path.

12 Claims, 5 Drawing Sheets

U.S. PATENT DOCUMENTS

| | | | |
|---|---|---|---|
| 6,426,944 | B1 | 7/2002 | Moore |
| 6,633,563 | B1 | 10/2003 | Lin et al. |
| 6,674,744 | B1 | 1/2004 | Doshi et al. |
| 6,714,535 | B1 | 3/2004 | Herh |
| 6,771,673 | B1 | 8/2004 | Baum et al. |
| 6,831,895 | B1 * | 12/2004 | Ji et al. .................. 370/237 |
| 6,831,898 | B1 | 12/2004 | Edsall et al. |
| 6,879,667 | B1 | 4/2005 | Carew et al. |
| 6,956,820 | B2 | 10/2005 | Zhu et al. |
| 7,177,943 | B1 | 2/2007 | Temoshenko et al. |
| 7,185,094 | B2 | 2/2007 | Marquette et al. |
| 7,212,519 | B2 | 5/2007 | Johnson et al. |
| 7,394,818 | B1 | 7/2008 | Johnson et al. |
| 7,424,025 | B2 * | 9/2008 | Qian et al. .................. 370/409 |
| 7,570,594 | B2 | 8/2009 | Zhu et al. |
| 2002/0006112 | A1 | 1/2002 | Jaber et al. |
| 2002/0012352 | A1 | 1/2002 | Hansson et al. |
| 2002/0016926 | A1 | 2/2002 | Nguyen et al. |
| 2002/0051464 | A1 | 5/2002 | Sin et al. |
| 2002/0191612 | A1 | 12/2002 | Curtis |
| 2003/0093555 | A1 | 5/2003 | Harding-Jones et al. |
| 2003/0099192 | A1 | 5/2003 | Scott et al. |
| 2003/0118039 | A1 | 6/2003 | Nishi et al. |
| 2003/0131263 | A1 | 7/2003 | Keane et al. |
| 2003/0142795 | A1 | 7/2003 | Gavette et al. |
| 2003/0193898 | A1 | 10/2003 | Wong et al. |
| 2004/0047345 | A1 | 3/2004 | Joseph et al. |
| 2004/0066782 | A1 | 4/2004 | Nassar |
| 2005/0068942 | A1 | 3/2005 | Chu et al. |
| 2005/0073998 | A1 | 4/2005 | Zhu et al. |
| 2007/0053300 | A1 | 3/2007 | Zhu et al. |
| 2007/0083528 | A1 | 4/2007 | Matthews et al. |

OTHER PUBLICATIONS

International Search Report and Written Opinion for International Application No. PCT/US04/31918 (Feb. 11, 2005).
Yoo et al., "A Media Stream Processing of VoIP Media Gateway," IEEE, pp. 91-94 (2003).
Notice of Allowance and Fee(s) Due for U.S. Appl. No. 11/545,788, filed Nov. 5, 2008.
Interview Summary for U.S. Appl. No. 11/545,788, filed Sep. 15, 2008.
Official Action for U.S. Appl. No. 10/943,513, filed Aug. 11, 2008.
Notification of Transmittal of the International Search Report and the Written Opinion of the International Searching Authority, or the Declaration for International Application No. PCT/US04/32232 (Jun. 2, 2008).
Notice of Allowance and Fee(s) Due for U.S. Appl. No. 10/676,233, filed May 2, 2008.
Official Action for U.S. Appl. No. 11/545,788, filed Mar. 11, 2008.
Official Action for U.S. Appl. No. 10/676,233, filed Nov. 28, 2007.
Official Action for U.S. Appl. No. 10/943,513, filed Nov. 26, 2007.
Official Action for U.S. Appl. No. 11/545,788, filed Nov. 14, 2007.
Interview Summary for U.S. Appl. No. 10/676,233, filed Aug. 22, 2007.
Official Action for U.S. Appl. No. 10/676,233, filed Jun. 11, 2007.
Official Action for U.S. Appl. No. 11/545,788, filed May 14, 2007.
Notification of European Publication Number and Information on the Application of Article 67(3) EPC for European Application No. 04789215.3 (May 24, 2006).
Notification of European Publication Number and Information on the Application of Article 67(3) EPC for European Application No. 04789383.9 (May 17, 2006).
Notification of European Publication Number and Information on the Application of Article 67(3) EPC for European Application No. 04789213.8 (May 17, 2006).
Supplemental Notice of Allowability for U.S. Appl. No. 10/943,275, filed Sep. 9, 2005.
Notice of Allowance and Fee(s) Due for U.S. Appl. No. 10/943,275, filed Feb. 11, 2005.
Final Official Action for U.S. Appl. No. 10/943,513, filed May 5, 2009.
Notice of Allowance and Issue Fee(s) Due for U.S. Appl. No. 11/545,788, filed Mar. 24, 2009.

* cited by examiner

| \multicolumn{5}{l}{NETWORK SEGMENT COST TABLE} | | | | |
|---|---|---|---|---|
| SEGMENT | DIRECTION | COST | DIRECTION | COST |
| 220 | NI 1 to RT1 | 1000 | RT1 to NI 1 | 1 |
| 222 | NI 1 to RT2 | 1000 | RT2 to NI 1 | 1000 |
| 224 | NI 2 to RT1 | 500 | RT1 to NI 2 | 1000 |
| 226 | NI 2 to RT2 | 500 | RT2 to NI 2 | 1 |
| 228 | NI 1 to RT3 | 1 | RT3 to RT1 | 1 |
| 230 | RT1 to RT4 | 10 | RT4 to RT1 | 10 |
| 232 | RT2 to RT4 | 10 | RT4 to RT2 | 10 |
| 234 | RT2 to RT5 | 10 | RT5 to RT2 | 10 |
| 236 | RT3 to RT6 | 1 | RT6 to RT3 | 1 |
| 238 | RT4 to RT6 | 10 | RT6 to RT4 | 10 |
| 240 | RT4 to RT7 | 1 | RT7 to RT4 | 1 |
| 242 | RT4 to RT5 | 10 | RT5 to RT4 | 10 |
| 244 | RT5 to RT7 | 10 | RT7 to RT5 | 10 |
| 246 | RT6 to NI d | 10 | NI d to RT6 | 10 |
| 248 | RT6 to RT7 | 10 | RT7 to RT6 | 10 |
| 250 | RT7 to NI d | 10 | NI d to RT7 | 10 |

METHODS, SYSTEMS, AND COMPUTER PROGRAM PRODUCTS FOR LOAD BALANCED AND SYMMETRIC PATH COMPUTATIONS FOR VOIP TRAFFIC ENGINEERING

RELATED APPLICATIONS

This application is a continuation-in-part of U.S. patent application Ser. No. 10/943,513 filed Sep. 17, 2004 (pending), which is a continuation-in-part of U.S. patent application Ser. No. 10/676,233, filed Oct. 1, 2003 now U.S. Pat. No. 7,424,025, and which claims the benefit of U.S. Provisional Patent Application Ser. No. 60/526,126 filed Dec. 1, 2003 and U.S. Provisional Patent Application Ser. No. 60/551,814 filed Mar. 10, 2004.

This application claims the benefit of U.S. Provisional Patent Application Ser. No. 60/748,800 filed Dec. 9, 2005.

This application is related to U.S. patent application Ser. No. 10/943,275 filed Sep. 17, 2004 (now U.S. Pat. No. 6,956,820).

The disclosure of each of the above-referenced documents is incorporated herein by reference in its entirety.

TECHNICAL FIELD

The subject matter described herein relates to providing voice over IP (VoIP) traffic engineering in a communications network. More particularly, the subject matter described herein relates to methods, systems, and computer program products for load balanced and symmetric path computations for VoIP traffic engineering.

BACKGROUND

Conventional shortest path first (SPF) routing protocols cause an IP device to select a path across a network to a destination IP device by computing path costs for all available network paths, as determined from link state information received at the IP device on a regular basis from neighboring SPF nodes in the network. Each path cost is calculated by summing the assigned cost for each network segment in the forward direction from the source IP device to the destination IP device. The segment costs are typically assigned by a network administrator to reflect a variety of attributes about each segment including geographic distance, equipment cost, and queue delays. Public networks utilizing SPF routing protocols and methods for defining paths most commonly use the published Open Shortest Path First (OSPF) specification. Networks intended to carry real-time interactive or delay-sensitive traffic such as VoIP or video may use a version of OSPF, called OSPF-TE, whose cost definitions and calculation methods have been modified for such delay-sensitive traffic. Regardless of the SPF protocol utilized, the SPF routing instance in an IP device conventionally determines the preferred path by using the path with the lowest total cost. If more than one path has the same lowest cost, the SPF routing instance may use all paths with the same lowest cost and distribute traffic across them in a load balanced fashion. The SPF routing protocol may modify assigned network segment costs when required by a network administrator, when a network node fails, or when a failure is detected on a network segment. When such a change occurs, routing protocol messages propagate the change to all SPF routing instances using standard protocol messages.

When the costs assigned to different directions of a network path are asymmetric, problems can result for bi-directional, delay-sensitive applications, such as RTP media streams. For example, if costs assigned to different directions of a network path are asymmetric, media gateways at each end of the path may select different paths for different directions of an RTP media stream. If one direction of an RTP media stream from a first media gateway to a second media gateway follows a different path from the reverse direction of the same media stream between the media gateways, the paths may experience different delays, resulting in an overall degradation of media stream quality. In addition, if one path fails while the other path remains active, network resources may be wasted.

Accordingly, in light of these difficulties associated with conventional methods for defining load balanced and symmetric paths through a network, there exists a need for improved methods, systems, and computer program products for load balanced and symmetric path computations for VoIP traffic engineering.

SUMMARY

The subject matter described herein includes methods, systems, and computer program products for load balanced and symmetric SPF path computations for VoIP traffic engineering. One method includes advertising an output interface cost in a first direction over a first network segment between a source IP device and a destination IP device that is different from an output interface cost advertised in a second direction over the first network segment. A plurality of available network paths between the source IP device and the destination IP device is identified. A path cost is calculated for each of the available network paths from the source IP device to the destination IP device. Calculating a path cost includes, for paths that include the first network segment, substituting the output interface cost advertised in the first direction with the output interface cost advertised in the second direction. The path costs are ranked based on the calculated costs. A lowest cost path is selected from the ranked paths. Both directions of a media session are assigned to the lowest cost path.

As used herein, the term "IP device" refers to any system that has at least one interface to a network, supports conventional network routing protocols, and accepts traffic in conventional formats. An IP device may be a conventional router or it may be an endpoint, such as a media gateway or a server. The term "source IP device" refers to an IP device serving as the origin of traffic to be carried across the network. The term "destination IP device" refers to an IP device serving as the destination or termination point in the network for the traffic. The term "node" refers to any system in the network that is capable of routing traffic and supporting SPF cost assignments and calculations. The term "segment" refers to a physical connection between adjacent network nodes. The term "path" refers to a defined set of segments and nodes that provide a connection across a network between an IP device sourcing traffic and an IP device sinking or terminating traffic. The term "forward cost" refers to a cost advertised by an IP device. The term "reverse cost" refers to a cost advertised to the IP device.

The subject matter described herein providing load balanced and symmetric path computations for VoIP traffic engineering may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer program product that implements the subject matter described herein may be located on a single device or computing platform or may be distributed across multiple devices and/or computing platforms.

BRIEF DESCRIPTION OF THE DRAWINGS

Preferred embodiments of the subject matter described herein will now be explained with reference to the accompanying drawings of which:

FIG. 2B is a table illustrating exemplary advertised segment costs for the network illustrated in FIG. 2A.

DETAILED DESCRIPTION

In view of the problems described above with respect to load balanced and symmetric path computations for VoIP traffic engineering, the subject matter described herein provides a method for load balanced and symmetric SPF path selection from a source IP device to a destination IP device through a network.

Figure 1A:
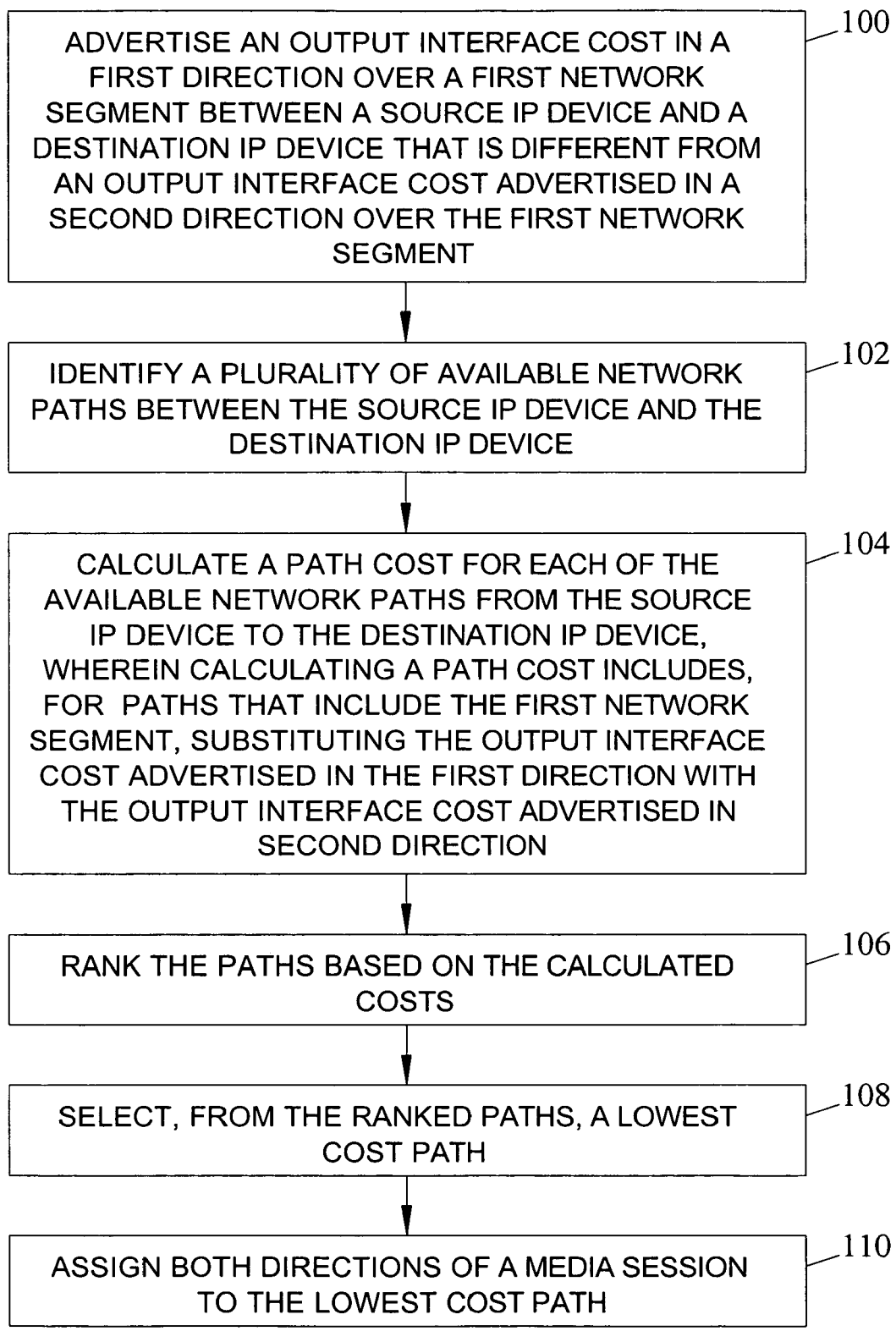
FIG. 1A is a flow chart of an exemplary process for assigning costs to network paths and for symmetrically assigning forward and reverse directions of a media session to the same network path according to an embodiment of the subject matter described herein.
Figure 1B:
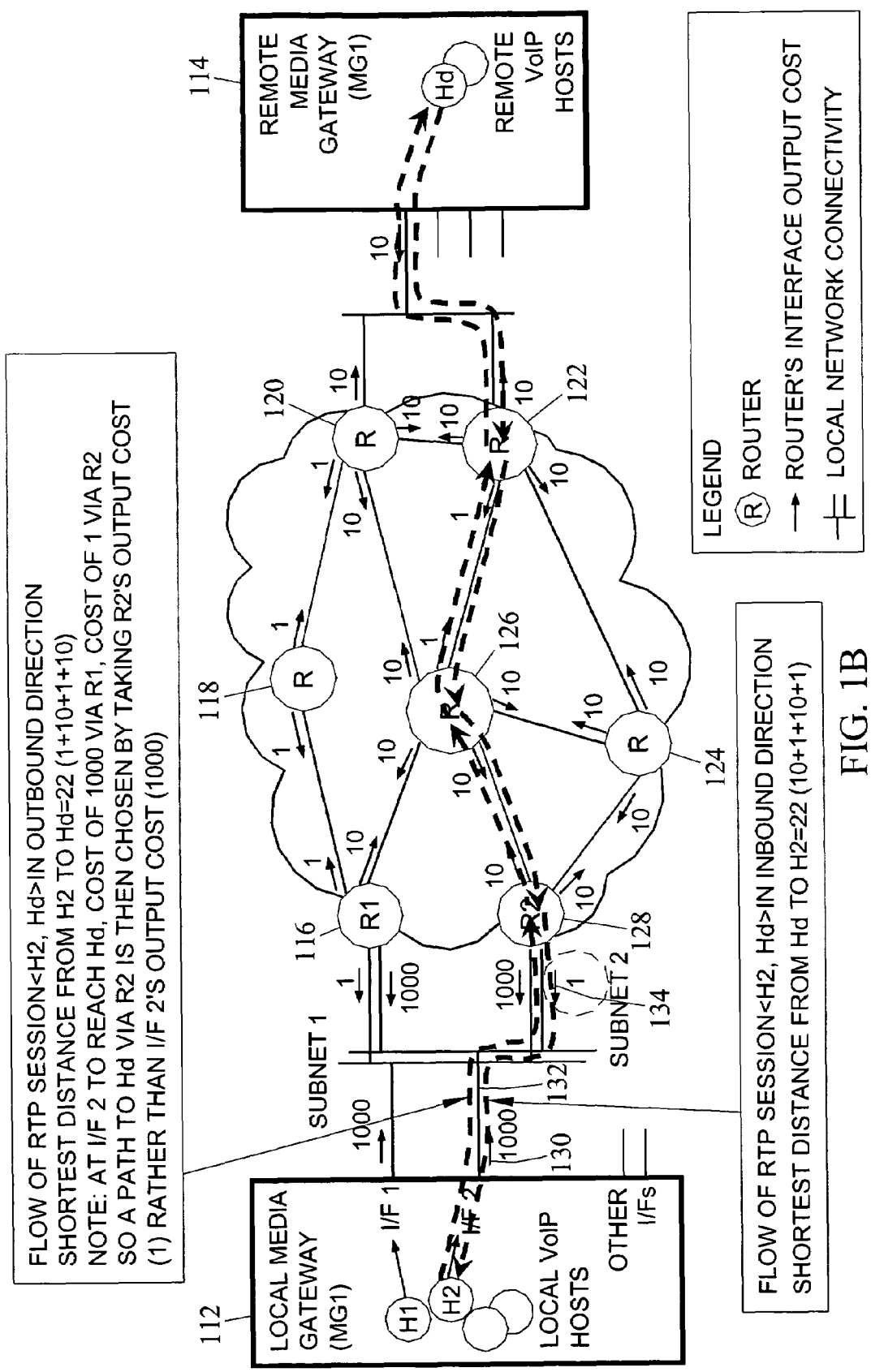
FIG. 1B is a network diagram illustrating an exemplary network including source and destination IP devices for assigning costs to network paths and for symmetrically assigning forward and reverse directions of a media session to the same network path according to an embodiment of the subject matter described herein.

FIG. 1A is a flow chart and FIG. 1B is a network diagram illustrating an exemplary process for assigning costs to network paths and for symmetrically assigning forward and reverse directions of media sessions to the same paths according to an embodiment of the subject matter described herein. Referring to FIG. 1A, in step 100, an output interface cost is advertised in a first direction over a first network segment between a source IP device and a destination. The output interface cost advertised in the first direction is different from an output interface cost advertised in a second direction over the first network segment. For example, the output interface cost advertised in the first direction may be assigned for traffic engineering purposes to direct traffic to or away from the output interface. The cost advertised in the second direction may be assigned by the adjacent router based on its cost for reaching a remote destination. Referring to FIG. 1B, an IP device 112 may be connected to an IP device 114 via a plurality of routers 116, 118, 120, 122, 124, 126, and 128. IP device 112 may assign a cost of 1000 to reach host H2 via interface I/F2 and may advertise this cost in the direction indicated by arrow 130 over segment 132. The cost of 1000 is different from the cost of 1 advertised by router 128 in the direction indicated by arrow 134 over segment 132 to reach host Hd. Since the cost advertised in one direction over network segment 132 is different from the cost advertised in the other direction, without the subject matter described herein, asymmetric media session assignment could result. However, as will be described in more detail below, the subject matter described herein includes substituting costs so that symmetric path assignment can be achieved.

Returning to FIG. 1A, in step 102, a plurality of available network paths is identified between the source and destination IP device. Referring to FIG. 1B, a plurality of network paths between VoIP hosts H1 and H2 in IP device 112 and VoIP host in IP device 114 may be identified. The network topology between IP devices 112 and 114 may be determined using conventional protocols, such as OSPF. Network topology information may be communicated via link state assignment (LSA) messages.

Returning to FIG. 1A, in step 104, a path cost is calculated for each of the available network paths between the source IP device and the destination IP device. Calculating a path cost may include, for paths that include the first network segment, substituting the output interface cost associated with the first direction of the output interface with the output interface associated with the second direction. Referring to FIG. 1B, when calculating a path cost that involves segment 132, IP device 112 may substitute the cost of 1000 to reach host H2 with the cost of 1 to reach host Hd advertised by router 128. The path calculation from host H2 to Hd will include the following costs (1+10+1+10). The path from H2 to Hd is indicated by the dotted arrow in the direction from H2 to Hd. IP device 114 may perform a similar calculation using the costs that it receives for reaching host H2. These costs are (10+1+10+1). The corresponding path is indicated by the dotted arrow from host Hd to host H2. Since the cost from H2 to Hd equals the cost from Hd to H2, a symmetric path assignment will result.

Returning to FIG. 1A, in step 106, the paths are ranked based on the calculated costs. Returning to FIG. 1B, if multiple paths exist between H2 and Hd, the paths may be ranked according to cost.

Returning to FIG. 1A, in step 108, a lowest cost path is selected from the ranked paths. Returning to FIG. 1B, if multiple paths exist, a lowest cost path may be selected.

Returning to FIG. 1A, in step 110, both directions of a media session are assigned to the lowest-cost path. Returning to FIG. 1B, outgoing media packets from H2 to host Hd will be assigned to the path corresponding to the arrow from H2 to Hd, and outgoing media packets from Hd to H2 will be assigned to the network path indicated by the dotted arrow from Hd to H2. The assignment of both directions of a media session to the same network path illustrated in FIG. 1B is achieved by the substitution of a cost advertised by a media gateway with a cost advertised to the media gateway. Such substitution for cost calculation purposes ensures symmetric path cost calculation in geographically diverse media gateways, even when the costs advertised in different directions over a link are different, for example, for traffic engineering purposes.

Exemplary Media Gateway Systems and Network Applications

Figure 2A:
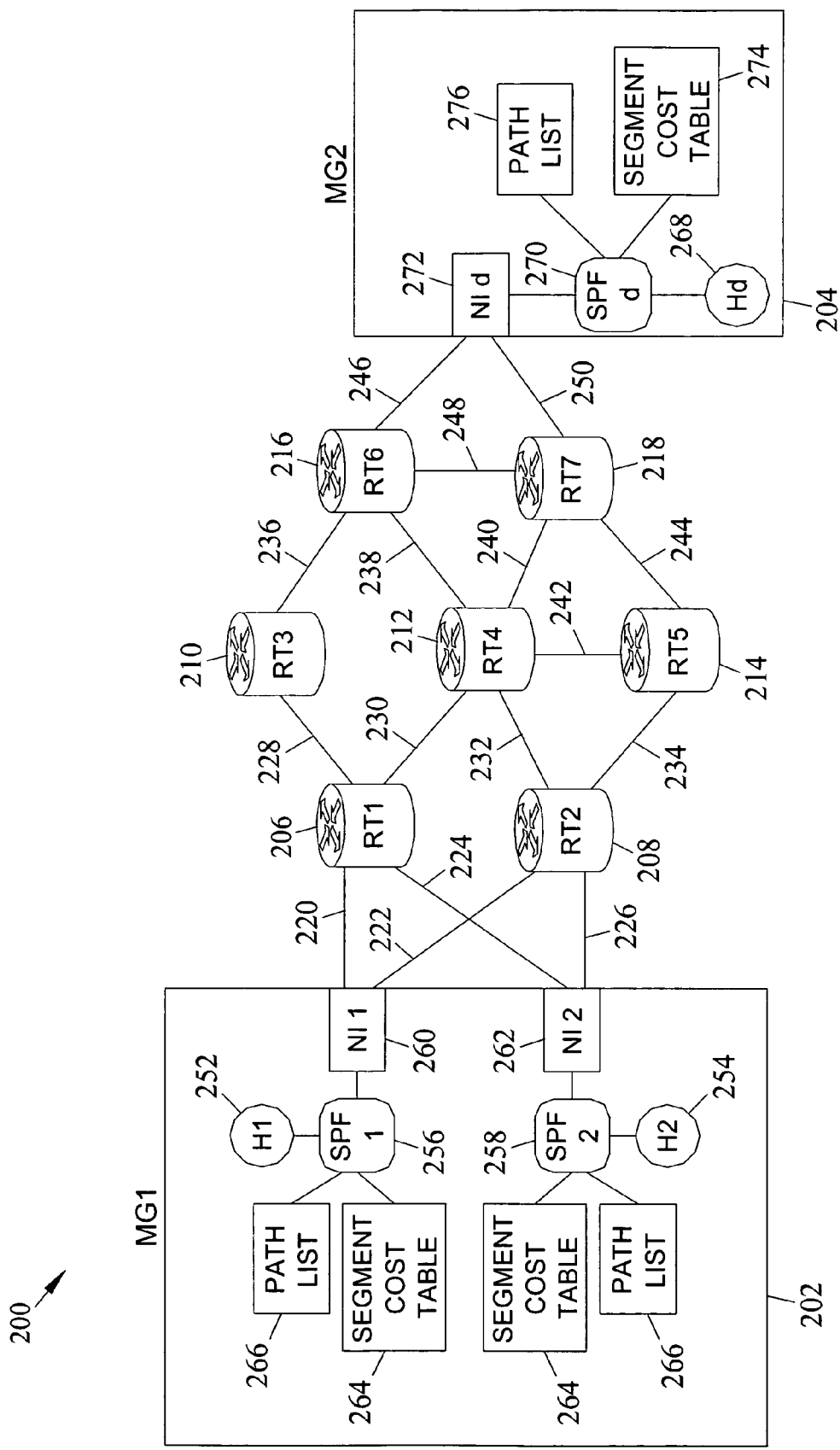
FIG. 2A is a block diagram of an exemplary network including two media gateways, each containing one network interface associated with a router instance, and a plurality of network routers and segments according to an embodiment of the subject matter described herein.

FIG. 2A is a diagram of an exemplary network 200 containing media gateways MG1 202 and MG2 204, a plurality of conventional SPF routers RT1 206, RT2 208, RT3 210, RT4 212, RT5 214, RT6 216, and RT7 218, and a plurality of network segments 220, 222, 224, 226, 228, 230, 232, 234, 236, 238, 240, 242, 244, 246, 248 and 250. MG1 202, MG2 204, and network routers RT1 206, RT2 208, RT3 210, RT4 212, RT5 214, RT6 216, and RT7 218 may be configured to utilize the OSPF routing protocol or any other protocol that utilizes SPF path computation methods to determine preferred path topologies through a network.

In FIG. 2A, MG1 202 may include two VoIP host functions H1 252 and H2 254, two router instances SPF 1 256 and SPF 2 258 and two network interfaces NI 1 260 and NI 2 262. In addition, media gateway 202 may include a cost table 264 and a path list 266 that are maintained by router instance 256 and 258. VoIP host functions H1 250 and H2 252 may each include a voice over IP transcoder circuit or any similar circuit that serves as a source or termination of application level voice, interactive video, or similar application with requirements on network path delay and routing topologies. Router instances 254 and 256 may each contain resources to implement the subject matter described herein. N11 260 may terminate a plurality of network segments including segment 220 to network router RT1 206 and segment 222 to network router RT2 208. Similarly, NI 2 260 may terminate a plurality of network segments including segment 224 to network router RT1 206 and segment 226 to network router RT2 208. MG1 202 may be a conventional IP device or a network aware media gateway.

MG2 204 may include one IP host function Hd 268, a router instance SPF d 270, and a network interface NI d 272. Media gateway 204 may also include a cost table 274 and a path list 276 that are maintained by router instance 270. VoIP host function Hd 268 may include a transcoder circuit or any similar circuit that serves as a source or termination of application level voice, interactive video, or similar application with requirements on network path delay and routing topologies. Router instance 270 may contain resources to implement the subject matter described herein. NI d 272 may terminate a plurality of network segments including segment 244 to network router RT6 216 and segment 248 to network router RT7 248. MG2 204 may be a conventional IP device or a network aware media gateway.

FIG. 2B also illustrates a network segment cost table corresponding to the network of FIG. 2A. The network segment cost table illustrates the costs advertised in various directions over the network segments illustrated in FIG. 2A. The network segment cost table may be distributed and stored as cost tables 264, 266, and 274 at media gateways 202 and 204. Network segment cost information may be exchanged by any suitable means, such as the distribution of link state assignment messages. The data in the network segment cost table can be used to establish symmetric paths between a source and a destination node, as will be described in detail below.

Figure 3:
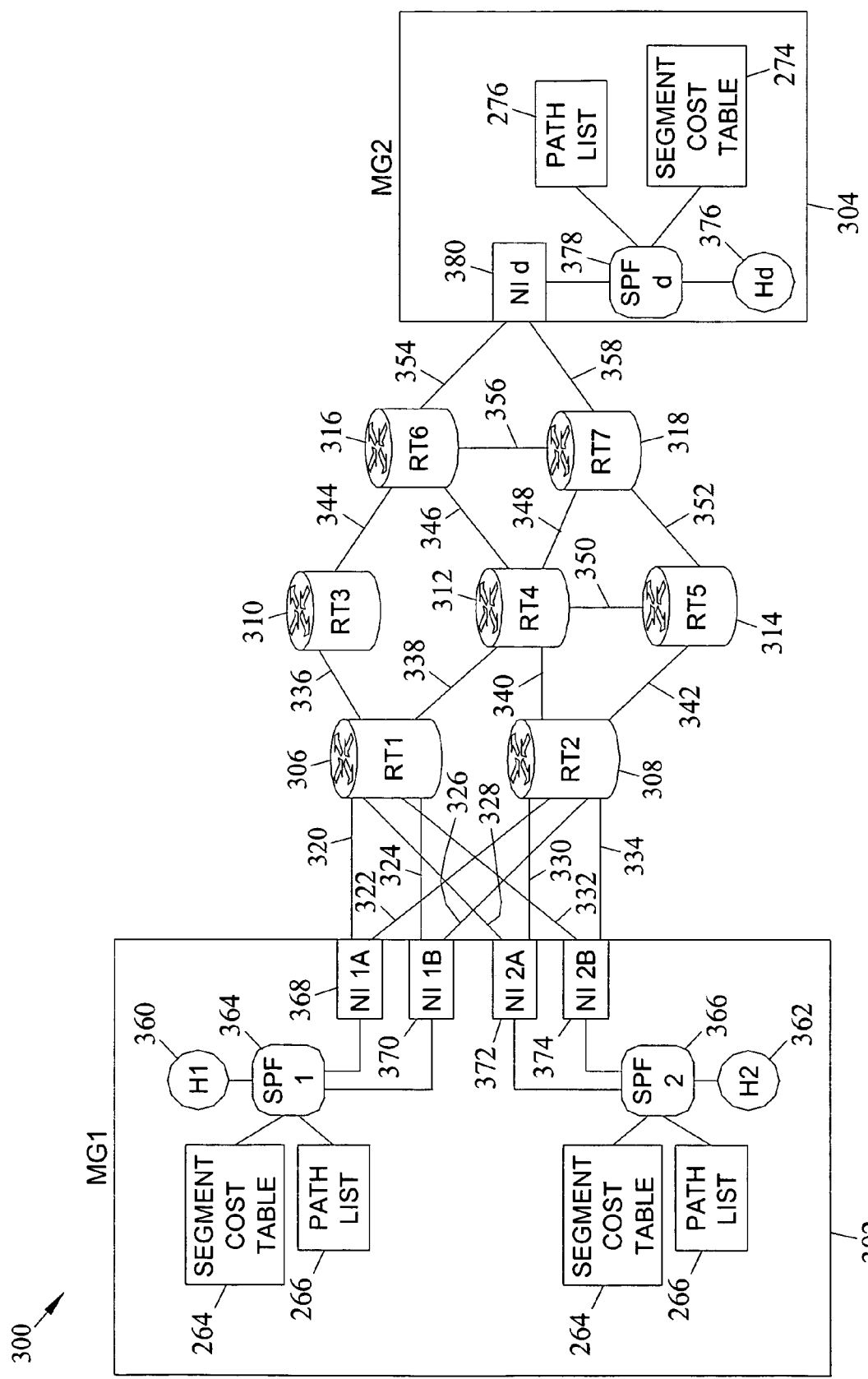
FIG. 3 is a block diagram of an exemplary data network including two media gateways, one of which contains a plurality of network interfaces associated with a plurality of router instances, and a plurality of network routers and segments according to an embodiment of the subject matter described herein.

In the example illustrated in FIG. 2A, each router instance 256, 258, and 270 is associated with a single network interface. In an alternate implementation, a router instance may be associated with a plurality of network interfaces. FIG. 3 illustrates a network in which a media gateway includes router instances that are associated with a plurality of network instances. In FIG. 3, a network 300 contains a network aware media gateway MG1 302, a conventional Media gateway MG2 304, network routers RT1 306, RT2 308, RT3 310, RT4 312, RT5 314, RT6 316, and RT7 318, and network segments 320, 322, 324, 326, 328, 330, 332, 334, 336, 338, 340, 342, 344, 346, 348, 350, 352, 354, 356, and 358. MG1 302, MG2 304, and network routers RT1 306, RT2 308, RT3 310, RT4 312, RT5 314, RT6 316, and RT7 318 may be configured to utilize the OSPF routing protocol or any other protocol that utilizes SPF path computation methods to determine preferred path topologies through a network.

In FIG. 3, MG1 302 may have two VoIP host modules H1 360 and H2 362 and two SPF routing instances SPF 1 364 and SPF 2 366. Router instance 364 may be associated with a plurality of network interfaces including NI 1A 368 and NI 1B 370. SPF 2 366 may be associated with a plurality of network interfaces including NI 2A 372 and NI 2B 374. Media gateway 302 may also include cost tables 264 and path lists 266 maintained by routing instances 364 and 366. VoIP host functions H1 360 and H2 362 may each include a transcoder circuit or any similar circuit that serves as a source or termination of application level voice, interactive video, or similar application with requirements on network path delay and routing topologies. Router instances 364 and 366 may each contain resources to implement the subject matter described herein. Interface NI 1A 368 may terminate a plurality of network segments including segment 320 to network router RT1 306 and segment 322 to network router RT2 308, while NI 1B 370 may terminate a plurality of network segments including segment 324 to network router RT1 306 and segment 328 to network router RT2 308. Interface NI 2A 372 may terminate a plurality of network segments including segment 328 to network router RT1 306 and segment 330 to network router RT2 308, while NI 2B 374 may terminate a plurality of network segments including segment 332 to network router RT1 306 and segment 334 to network router RT2 308.

MG2 304 may include one IP host function Hd 376, one SPF routing instance SPF d 378, and at least one network interface NI d 380. VoIP host function Hd 376 may include a transcoder circuit or any similar circuit that serves as a source or termination of application level voice, interactive video, or similar application with requirements on network path delay and routing topologies. Routing instance 378 may contain resources to implement the subject matter described herein. Media gateway 304 may include a cost table 274 and a path list 276 which are maintained by router instance 378. Interface NI d 380 may terminate a plurality of network segments including segment 354 to network router RT6 316 and segment 358 to network router RT7 318.

The topology of the network between media gateways 302 and 304 is the same as that illustrated in FIG. 2A. Hence, the cost table associated with the network segments of a network illustrated in FIG. 3 may be the same as that illustrated in FIG. 2B. Accordingly, the network segment cost table has been omitted from FIG. 3 for simplicity. The symmetric path calculations performed by the media gateways in FIG. 3 may be the same as that for the network illustrated in FIG. 2A. Hence, the discussion that follows with regard to calculation of costs for the network segments in FIG. 2A can be applied to the network of FIG. 3.

Exemplary Network Path Calculations

Returning to FIG. 2A, in an exemplary application of network 200, costs for reaching VoIP hosts may be advertised over network segments 220, 222, 224, 226, 228, 230, 232, 234, 236, 238, 240, 242, 246, 248, and 250 as illustrated by the network segment cost table in FIG. 2B. The costs may be assigned by a network administrator based on any of a variety of criteria deemed important by the network administrator, perhaps including original equipment cost, equipment utilization, or path delay characteristics. The costs for reaching VoIP hosts advertised over some segments may be symmetric, such as those for segments 228, 230, 232, 234, 236, 238, 240, 242, 244, 246, 248, and 250, while others may be asymmetric, such as those for segments 220, 222, 224, and 226.

Media gateways MG1 202 and MG2 204 and network routers RT1 206, RT2 208, RT3 210, RT4 212, RT5 214, RT6 216, and RT7 218 may utilize the published OSPF routing protocol to maintain a copy of the assigned network segment costs as well as to define and manage path definitions in network 200.

In one implementation, router instance SPF 1 256 in media gateway MG1 202 may execute an algorithm based on the subject matter described herein to develop a list of paths for VoIP traffic originating at VoIP host H1 252 and terminating at VoIP host Hd 268 in MG2 204. Router instance 256 may limit the number of intervening routers on each path to be analyzed in order to minimize the computational work required to generate aggregate costs for available network paths. For example, router instance 256 may only consider network path definitions with three or fewer routers between MG1 202 and MG2 204. Using this restriction, SPF 1 256 would identify the following 6 potential network paths from VoIP host H1 252 to VoIP host Hd 264:

a) NI 1 260::RT1 206::RT3 210::RT6 216::NI d 268
b) NI 1 260::RT1 206::RT4 212::RT6 216::NI d 268
c) NI 1 260::RT1 206::RT4 212::RT7 218::NI d 268
d) NI 1 260::RT2 208::RT4 212::RT6 216::NI d 268
e) NI 1 260::RT2 208::RT4 212::RT7 218::NI d 268
f) NI 1 260::RT2 208::RT5 214::RT7 218::NI d 268

The cost models associated with each of these network path definitions may then be defined as follows:

Cost (a)=Cost (220)+Cost (228)+Cost (236)+Cost (246)
Cost (b)=Cost (220)+Cost (230)+Cost (238)+Cost (246)
Cost (c)=Cost (220)+Cost (230)+Cost (240)+Cost (250)
Cost (d)=Cost (222)+Cost (232)+Cost (238)+Cost (246)
Cost (e)=Cost (222)+Cost (232)+Cost (240)+Cost (250)
Cost (f)=Cost (222)+Cost (234)+Cost (244)+Cost (250)

In one example, router instance 256 may calculate the aggregate path cost from H1 in MG1 202 to Hd 268 in MG2 204 for each of the network path topologies defined above. Router instance 256 may substitute costs advertised by next hop routers 206 and 208 for reaching host Hd 268 with asymmetric costs for reaching host H1 252 advertised over the same segments. For example, the cost associated with reaching host H1 252 via interface N1 of 1000 may be substituted with the cost of 1 for reaching host Hd 268 via router 206. If this substitution is performed, the following cost calculations may be performed for reaching host Hd 268 from host H1 252 via interface NI 1 260.

| | |
|---|---|
| 1+1+1+10=13 | Cost (a) |
| 1+10+10+10=31 | Cost (b) |
| 1+10+1+10=22 | Cost (c) |
| 1000+10+10+10=1030 | Cost (d) |
| 1000+10+1+10=1021 | Cost (e) |
| 1000+10+10+10=1030 | Cost (f) |

SPF instance SPF d 270 may perform similar cost calculations to reach host H1 252 from host Hd 268 via interface Ni d 272. The following costs calculations may be performed by SPF instance SPF d 270:

| | |
|---|---|
| 1+1+1+10=13 | Cost (a) |
| 1+10+10+10=31 | Cost (b) |
| 1+10+1+10=22 | Cost (c) |
| 1000+10+10+10=1030 | Cost (d) |
| 1000+10+1+10=1021 | Cost (e) |
| 1000+10+10+10=1030 | Cost (f) |

As can be see above, the cost calculations for reaching host Hd 268 from host H1 252 are symmetric with respect to those for reaching host H1 252 from host Hd 268. As a result, opposing directions of media sessions will be assigned to the same paths. Similar cost calculations may be performed for media sessions between host H2 254 and host Hd 268. Paths from H2 254 to host Hd 268 may be as follows:

a) NI 2 262::RT1 206::RT3 210::RT6 216::NI d 268
b) NI 2 262::RT1 206::RT4 212::RT6 216::NI d 268
c) NI 2262::RT1 206::RT4 212::RT7 218::NI d 268
d) NI 2 262::RT2 208::RT4 212::RT6 216::NI d 268
e) NI 2 262::RT2 208::RT4 212::RT7 218::NI d 268
f) NI 2 262::RT2 208::RT5 214::RT7 218::NI d 268

The cost models associated with each of these network path definitions may then be defined as follows:

Cost (a)=Cost (224)+Cost (228)+Cost (236)+Cost (246)
Cost (b)=Cost (224)+Cost (230)+Cost (238)+Cost (246)
Cost (c)=Cost (224)+Cost (230)+Cost (240)+Cost (250)
Cost (d)=Cost (226)+Cost (232)+Cost (238)+Cost (246)
Cost (e)=Cost (226)+Cost (232)+Cost (240)+Cost (250)
Cost (f)=Cost (226)+Cost (234)+Cost (244)+Cost (250)

As with the example above, where costs from a network interface, such as network interface Ni 2 262 are asymmetric with respect to the costs for reaching Hd via next hop router RT2 208, the cost advertised by media gateway 200 for reaching host H2 254 via network interface Ni 2 262 may be substituted with those advertised by next hop router RT2 208 for reaching host Hd 268. Exemplary cost calculations that may be performed are as follows:

| | |
|---|---|
| 500+1+1+10=1012 | Cost (a) |
| 500+10+10+10=1012 | Cost (b) |
| 500+10+1+10=1021 | Cost (c) |
| 500+10+10+10=530 | Cost (d) |
| 500+10+1+10=521 | Cost (e) |
| 500+10+10+10=530 | Cost (f) |

The following calculations may be performed by SPF instance SPF d 270 for calculating paths for reaching host H2 254 from host Hd 268:

| | |
|---|---|
| 1000+1+1+10=1012 | Cost (a) |
| 1000+10+10+10=1030 | Cost (b) |
| 1000+10+1+10=1021 | Cost (c) |
| 1+10+10+10=31 | Cost (d) |
| 1+10+1+10=22 | Cost (e) |
| 1+10+10+10=31 | Cost (f) |

As can be seen above, the cost for reaching host Hd 268 from host H2 254 are equal to those for reaching host H2 254 from host Hd 268. As a result, symmetric VoIP path assignment can be achieved.

According to one aspect of the subject matter described herein, a system for symmetric network path costs assignment and media path selection is provided. The system may include means for advertising an output interface cost in a first direction over a first network segment between a source IP device and a destination IP device that is different from an output interface cost advertised in a second direction over the first network segment. For example, referring to FIG. 1B, media gateway 112 may include an interface, such as a command line interface or a graphical user interface that allows a cost for reaching host H2 via interface I/F2 of 1000 that is different from the cost advertised by router 128 for reaching host Hd.

The system may further include means for identifying a plurality of available network paths between the source IP device and the destination IP device. For example, referring to FIG. 2, SPF instances 256 and 258 may respectively identify paths between host H1 252 and H2 254 and host Hd 268.

The system may include means for calculating a path cost for each of the available network paths from the source IP device to the destination IP device, wherein, calculating a path cost includes, for paths that include the first network segment, substituting the output interface cost advertised in the first direction with the output interface cost advertised in the second direction. For example, referring to FIG. 1B, a router instance associated with media gateway 112 may calculate cost associated with paths between hosts H1 and H2 and host Hd. In calculating the costs, the router instance may substitute asymmetrically assigned path costs with path costs received from next hop routers 116 and 128.

The system may further include ranking the paths based on the calculated costs. For example, in FIG. 1B, an SPF instance associated with media gateway 112 may rank paths according to ascending or descending costs.

The system may further include means for selecting, from the ranked paths, a lowest cost path. For example, referring to FIG. 1B, a router instance associated with media gateway 112 may assign a media session to the lowest cost path.

The system may further include means for assigning both directions of a media session to the lowest cost path. For example, referring to FIG. 1B, a router instance associated with media gateway 112 may select a lowest cost path from host H2 to host Hd, and a router instance associated with media gateway 114 may select the same lowest cost path from Hd to H2 and assign the media session to this path.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for load balanced and symmetric shortest-path-first (SPF) path selection from a source IP device to a destination IP device through a network, the method comprising:
    (a) advertising, from a source IP device, at least a portion of which is implemented in hardware, an output interface cost in a first direction over a first network segment between the source IP device and a destination IP device that is different from an output interface cost advertised in a second direction over the first network segment;
    (b) identifying, by the source IP device, a plurality of available network paths between the source IP device and the destination IP device
    (c) calculating, by the source IP device, a path cost for each of the available network paths from the source IP device to the destination IP device, wherein calculating a path cost includes, for paths that include the first network segment, substituting the output interface cost advertised in the first direction with the output interface cost advertised in the second direction;
    (d) ranking, by the source IP device, the paths based on the calculated costs;
    (e) selecting, by the source IP device, from the ranked paths, a lowest cost path; and
    (f) assigning both directions of a media session to the lowest cost path.

2. The method of claim 1 wherein calculating the path costs includes calculating the costs using an Open Shortest Path First (OSPF) protocol.

3. The method of claim 2 wherein the output interface cost advertised in the first direction is assigned for traffic engineering purposes.

4. The method of claim 1 wherein the output interface cost advertised in the first direction of the first segment is at least one order of magnitude greater than the output interface cost advertised in the second direction of the first segment.

5. The method of claim 1 wherein the output interface cost advertised in the first direction over the first network segment is at least one order of magnitude less than the output interface cost advertised in the second direction of the first network segment.

6. The method of claim 1 wherein the output interface cost advertised in the first direction over the network segment comprises a cost for reaching a voice over IP host in the source IP device and wherein the cost advertised in the second direction over the first network segment includes a cost for reaching a voice over IP host in the destination IP device.

7. The method of claim 1 wherein the source and destination IP devices each comprises a media gateway.

8. The method of claim 1 wherein assigning both directions of the media session to the lowest cost path comprises:
    (a) at the source IP device, assigning media packets associated with the session that are output from the source IP device to the lowest cost path; and
    (b) at the destination IP device, assigning media packets associated with the session that are output from the destination IP device to the lowest cost path.

9. A system for obtaining a symmetric shortest-path-first (SPE) path selection from a source IP device to a destination IP device through a network, the system comprising:
    a source IP device, at least a portion of which is implemented in hardware, the source IP device including:
    (a) means in the source IP device for advertising an output interface cost in a first direction over a first network segment between the source IP device and a destination IP device that is different from an output
    (b) means in the source IP device for identifying a plurality of available network paths between the source IP device and the destination IP device;
    (c) means in the source IP device for calculating a path cost for each of the available network paths from the source IP device to the destination IP device, wherein calculating a path cost includes, for paths that include the first network segment, substituting the output interface cost advertised in the first direction with the output interface cost advertised in the second direction;
    (d) means in the source IP device for ranking the paths based on the calculated costs;
    (e) means in the source IP device for selecting, from the ranked paths, a lowest cost path; and
    (f) means for assigning both directions of a media session to the lowest cost path.

10. The system of claim 9 wherein the source and destination IP devices each comprises a media gateway.

11. A computer program product comprising computer-executable instructions embodied in a computer-readable medium for performing steps comprising:
  (a) advertising an output interface cost in a first direction over a first network segment between a source IP device and a destination IP
  (a) advertising an output interface cost in a first direction over a first network segment between a source IP device and a destination IP device that is different from an output interface cost advertised in a second direction over the first network segment;
  (b) identifying a plurality of available network paths between the source IP device and the destination IP device;
  (c) calculating a path cost for each of the available network paths from the source IP device to the destination IP device, wherein calculating a path cost includes, for paths that include the first network segment, substituting the output interface cost advertised in the first direction with the output interface cost advertised in the second direction;
  (d) ranking the paths based on the calculated costs;
  (e) selecting, from the ranked paths, a lowest cost path; and
  (f) assigning both directions of a media session to the lowest cost path.

12. The computer program product of claim 11 wherein the source and destination IP devices each comprises a media gateway.

* * * * *